US008645650B2

(12) United States Patent
Brassow

(10) Patent No.: US 8,645,650 B2
(45) Date of Patent: Feb. 4, 2014

(54) AUGMENTED ADVISORY LOCK MECHANISM FOR TIGHTLY-COUPLED CLUSTERS

(75) Inventor: Jonathan E. Brassow, Eagan, MN (US)

(73) Assignee: Red Hat, Inc., Raleigh, NC (US)

( * ) Notice: Subject to any disclaimer, the term of this patent is extended or adjusted under 35 U.S.C. 154(b) by 393 days.

(21) Appl. No.: 12/697,123

(22) Filed: Jan. 29, 2010

(65) Prior Publication Data

US 2011/0191561 A1    Aug. 4, 2011

(51) Int. Cl.
*G06F 12/00* (2006.01)
(52) U.S. Cl.
USPC ............... 711/163; 711/152; 711/E12.094
(58) Field of Classification Search
USPC .................................................. 711/163, 152
See application file for complete search history.

(56) References Cited

U.S. PATENT DOCUMENTS

| 5,966,706 A * | 10/1999 | Biliris et al. ........................... 1/1 |
| 5,987,550 A * | 11/1999 | Shagam ........................ 710/119 |
| 2007/0198792 A1* | 8/2007 | Dice et al. .................... 711/163 |

OTHER PUBLICATIONS

"Distributed Lock Manager", http://en.wikipedia.org/wiki/Distributed_lock_manager, Last modified on Jan. 22, 2010, pp. 1-4.
"GFS.History", DataCore digital services, Open Source Subversion Repository, https://open.datacore.ch/DCwiki.open/Wiki.jsp?page=GFS.History, (1994-2008), pp. 1-2.
"Gulm Project p.", http://sources.redhat.com/cluster/gulm, printed on Jan. 29, 2010, 1 pg.
Barry, Andrew, et al., "SCSI Device Memory Export Protocol (DMEP) T10 Presentation", Sistina Software, 1313 Fifth St. S.E., Suite 111, Minneapolis, MN 55414, (Sep. 2000), pp. 1-46.
Caulfield, Christine, "Programming Locking Applications", Copyright 2007, (2007), pp. 1-51.
Kronenberg, Nancy P., et al., "VAXclusters: A Closely-Coupled Distributed System", *ACM Transactions on Computer Systems*, vol. 4, No. 2, (May 1986), pp. 130-146.

* cited by examiner

*Primary Examiner* — Reginald Bragdon
*Assistant Examiner* — Aracelis Ruiz
(74) *Attorney, Agent, or Firm* — Lowenstein Standler LLP

(57) ABSTRACT

An inter-machine locking mechanism coordinates the access of shared resources in a tightly-coupled cluster that includes a number of processing systems. When a requesting processing system acquires a lock to access a resource, a comparison is made between values of a global counter and a local counter. The global counter indicates the number of times the lock is acquired exclusively by any of the processing systems. Based on the comparison result, the requesting processing system determines whether the resource has been modified since the last time it held the lock.

16 Claims, 5 Drawing Sheets

AUGMENTED ADVISORY LOCK MECHANISM FOR TIGHTLY-COUPLED CLUSTERS

TECHNICAL FIELD

Embodiments of the present invention relate to a computer system, and more specifically, to the management of shared resources in a tightly-coupled cluster.

BACKGROUND

A "tightly-coupled cluster" is a system of multiple machines that share common resources and are typically co-located. When machines are sharing resources, they need to be careful not to perform simultaneous conflicting operations. For example, when one machine is altering a resource, the other machines should not be accessing it. Coordination of their operations on the resource can be done by the use of inter-machine locks.

Conflicting operations, which these inter-machine locks prevent, generally involve shared resources which are accessible by all of the machines in a cluster. Access to the shared resources (e.g., SAN-attached disks) is typically slower than access to local memory (e.g., caches). A machine may save a copy of a shared resource in its local memory. However, the local copy may become invalid if the resource in the shared location is modified by other machines. The local copy can be accessed freely while the resource is protected by an inter-machine lock; but if the lock is released, the resource must be validated upon the next lock acquisition. This validation usually comes from re-reading the shared resource, which is a performance-negative operation.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for augmenting an inter-machine locking mechanism to include knowledge about whether a shared resource has changed. One purpose of the augmentation is to facilitate the elimination of unnecessary cache validation work. Definitive knowledge of whether or not another system has altered the shared resource allows a caller machine to skip the process of cache validation. This knowledge can be derived from the past history of the lock associated with the shared resource; in particular, whether the lock has been acquired by another machine for the purpose of modifying the shared resource.

Embodiments of the present invention can be built upon any of a number of known inter-machine locking mechanisms that can be either distributed or centralized. The method of augmentation will necessarily vary based on the chosen inter-machine locking. In one embodiment, the act of tracking whether machines have modified a resource is to monitor whether the lock has been acquired exclusively (signaling the intent of an acquirer to modify the resource). The exclusive acquisition of the lock can be monitored by way of counters. A distributed locking manager (DLM) can be utilized in one embodiment as the inter-machine locking mechanism. The DLM provides a range of shared and exclusive locking modes, as well as a way to utilize a small amount of inter-machine shared memory. The small amount of inter-machine shared memory can be used to store a global counter. The global counter is incremented before an exclusive lock is released. This global counter is used to compare against a local, non-shared counter that is not updated when another machine acquires an exclusive lock, but is updated when the local machine acquires either an exclusive or shared lock (signaling the intent of the local machine to either modify or read the resource). The comparison result of the two counters indicates whether the resource has been modified since the last time the local machine held the lock.

With the knowledge of the state of the resource, a machine, upon acquiring a lock, can determine whether it can read from a local (e.g., cached) copy of the resource without accessing a shared location (e.g., SAN-attached disks) for the resource. This is an improvement over the otherwise necessary steps of reading the shared location in order to validate the local copy, reprocessing the results to account for any potential changes, making modifications locally, and then writing the resource to the shared location. As a result, the performance of data access can be accelerated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
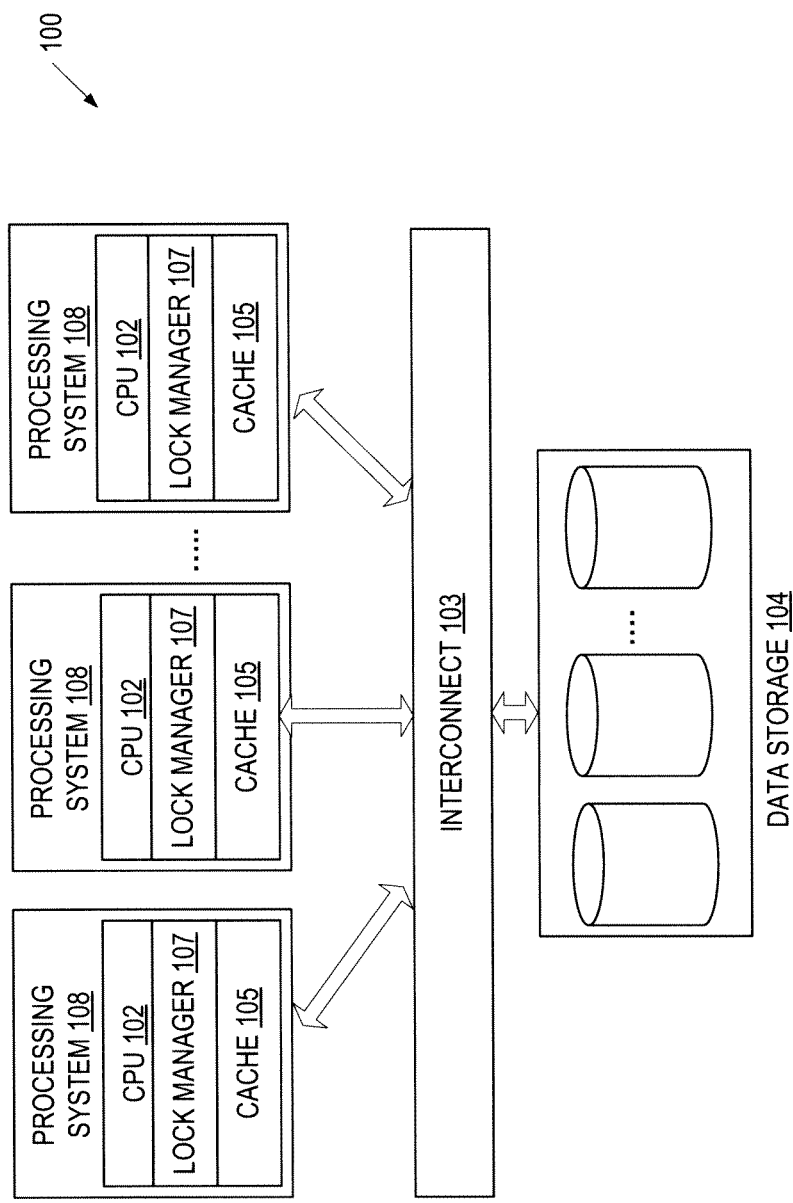
FIG. 1 is a block diagram of a tightly-coupled cluster which implements embodiments of the invention.

FIG. 1 illustrates an exemplary cluster 100 which implements embodiments of the invention. In one embodiment, the cluster 100 is a tightly-coupled cluster that includes multiple processing systems 108 (also referred to as "machines") coupled to shared data storage 104 via an interconnect 103. The data storage 104 may include magnetic or optical storage based disks, tapes or hard drives, etc. The interconnect 103 provides access to the data storage 104 for the processing systems 108. The data storage 104 stores shared resources. The shared resources may include a file in a file system, a record in a database, a block of data, or anything else that an application designer chooses.

Each processing system 108 may include one or more central processing units (CPUs) 102 and a local (non-shared) memory, such as a cache 105. Each processing system 108 also includes a lock manager 107, which is responsible for maintaining the inter-machine locks. Although not shown in FIG. 1, the processing systems 108 may be connected to external networked resources via a network, which may be a public network (e.g., the Internet) or a private network (e.g., an Ethernet or a local area Network (LAN)).

To ensure data coherency, each processing system 108 obtains a lock when reading from or writing to a shared resource. The lock is released when the read/write operation is completed. Each lock is associated with a shared resource. In one embodiment, the locks may be distributed across the processing systems 108. When a processing system 108 (referred to as a requesting machine) requests a lock for a shared resource, its lock manager 107 identifies or calculates the location of the lock. For example, with a distributed inter-machine locking mechanism, the lock manager 107 may use a lock identifier to calculate a value, which can be mapped to a processing system 108 (referred to as a lock managing machine) that manages and stores the lock. The lock managing machine may store the lock in a data structure in its local memory. With a centralized inter-machine locking mechanism, a designated machine in the cluster may serve as the lock managing machine for all of the machines in the cluster.

In one embodiment, after the lock location is determined, the requesting machine sends a lock request to the lock managing machine to acquire the lock. In response, the lock managing machine returns an indication of success (lock acquired) or failure (lock acquisition failed) to the requesting machine. If the lock is acquired successfully, the lock-managing machine also returns a small portion of shared memory associated with the lock.

According to embodiments of the present invention, a shared, global counter is stored in the shared memory associated with the locks provided by the inter-machine locking mechanism (for example, the DLM). Embodiments of the invention use this global counter to keep track of the number of times its associated lock is acquired exclusively by any machine in the cluster. Embodiments of the invention also maintain a non-shared, local copy of the counter value associated with the lock. Through an augmented Application Programming Interface (API), a requesting machine (which attempts to access shared resources) calls functions to compare the local counter value with the global counter value, and the returned value of the function indicates to the requesting machine whether another machine has acquired the lock exclusively since it last held the lock. The actions of incrementing and comparing the counters are encapsulated in the functions. If the lock has not been acquired exclusively (that is, the local counter value is the same as the current value of the global counter), it means the shared resource associated with the lock has not been modified by another machine. Therefore, the machine can safely use its cached copy of the shared resource. If the lock has been acquired exclusively (that is, the local counter value is different from the current value of the global counter), it means the shared resource associated with the lock has been modified by another machine. Therefore, the machine cannot safely use its cached copy of the shared resource.

Figure 2:
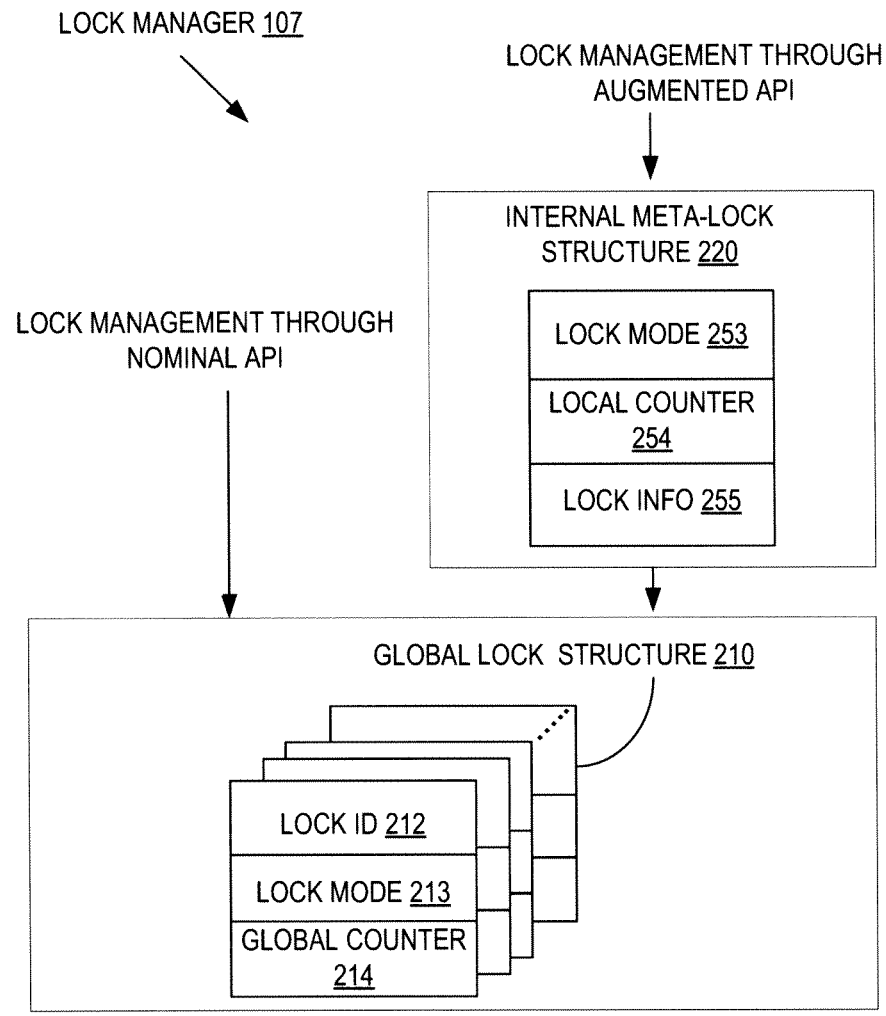
FIG. 2 is a diagram of one embodiment of a lock manager that implements an augmented API for managing locks.

FIG. 2 illustrates an embodiment of the lock manager 107 in each of the processing systems 108 that uses an inter-machine locking mechanism to manage locks. The lock manager 107 maintains an internal meta-lock structure 220. In an embodiment where the DLM is used as the inter-machine locking mechanism, the DLM provides a portion of the shared memory which can be used to store a global lock structure 210.

The global lock structure 210 is used by all of the machines in a cluster through a nominal API or an augmented API. A machine that manages locks through the nominal API does not receive the benefit of advisory information regarding the current state of a shared resource. Alternatively, a machine may manage locks through the augmented API according to embodiments of the present invention. The augmented API utilizes the information stored in the internal meta-lock structure 220 as well as the information stored in the global lock structure 210 to provide advisory information regarding the current state of a shared resource (i.e., whether the shared resource has been modified since the machine last held the lock). In the embodiment of FIG. 2, the global lock structure 210 stores the information of a number of locks. Each lock is identified by a lock ID 212 and is associated with a lock mode 213. A portion of shared memory is used by embodiments of the invention as a global counter 214.

Embodiments of the present invention provide a number of lock modes to derive advisory information regarding whether a shared resource has been modified. A machine at a given time can hold a lock in the EXCLUSIVE (when intending to alter the resource), SHARED (when intending to read the resource), UNLOCK (when access to the resource is finished), or MONITOR (when access to the resource is finished but subsequent access to the resource is expected) mode. The lock mode 213 in the global lock structure 210 indicates whether its associated lock is being held in the EXCLUSIVE, SHARED, or UNLOCK mode. The MONITOR mode is tracked by the internal meta-lock structure 220 instead of the global lock structure 210. In one embodiment, the lock mode 213 may include machine-specific information. For example, the lock mode 213 may indicate that the lock is concurrently held by a first machine and a second machine in the SHARED mode. The global counter 214 indicates the number of times the lock has been acquired exclusively by any of the processing systems 108.

The internal meta-lock structure 220, which is used by the augmented API, stores a lock mode 253, a local counter 254 and other lock information 255. The internal meta-lock structure 220 is non-shared and is used by the local machine on which the structure 220 resides. The lock mode 253 indicates the mode of the lock (EXCLUSIVE, SHARED, MONITOR, or UNLOCK) held by the local machine.

The local counter 254 and the global counter 214 operate in cooperation of the lock modes to derive advisory information regarding whether a shared resource has been modified. In one embodiment, a lock user (e.g., a machine in a cluster) can acquire an EXCLUSIVE lock (i.e., a lock in the EXCLUSIVE mode) when intending to alter the resource, or a SHARED lock (i.e., a lock in the SHARED mode) when intending to read the resource. The lock user can release the lock by placing the lock in the UNLOCK mode when it finishes with the resource. The lock user can change either an EXCLUSIVE lock or a SHARED lock to MONITOR. A lock held in the MONITOR mode by one machine does not conflict with other machines that wish to acquire the same lock. However, when the lock is held in the MONITOR mode by a machine and the same machine subsequently acquires the lock in the EXCLUSIVE or SHARED modes, the returned value for the lock acquisition can be 1) an error code (e.g., when a connection problem occurs), 2) success, indicating some other machine or machines have grabbed the lock exclusively while the lock is held in the MONITOR mode, or 3) success, indicating no one else has acquired the lock exclusively while the lock was held in the MONITOR mode. In one embodiment, the lock structures 210 and 220 can be hidden from the lock user. Thus, the lock users do not see the structures 210 and 220 and do not know about the counters 214 and 254. The only thing that the lock users receive from the functions of the augmented API are a return value indicating error, success (resource modified), and success (resource unmodified). Abstracting the details away from the lock users greatly simplifies the use of the augmented API.

Figure 3:
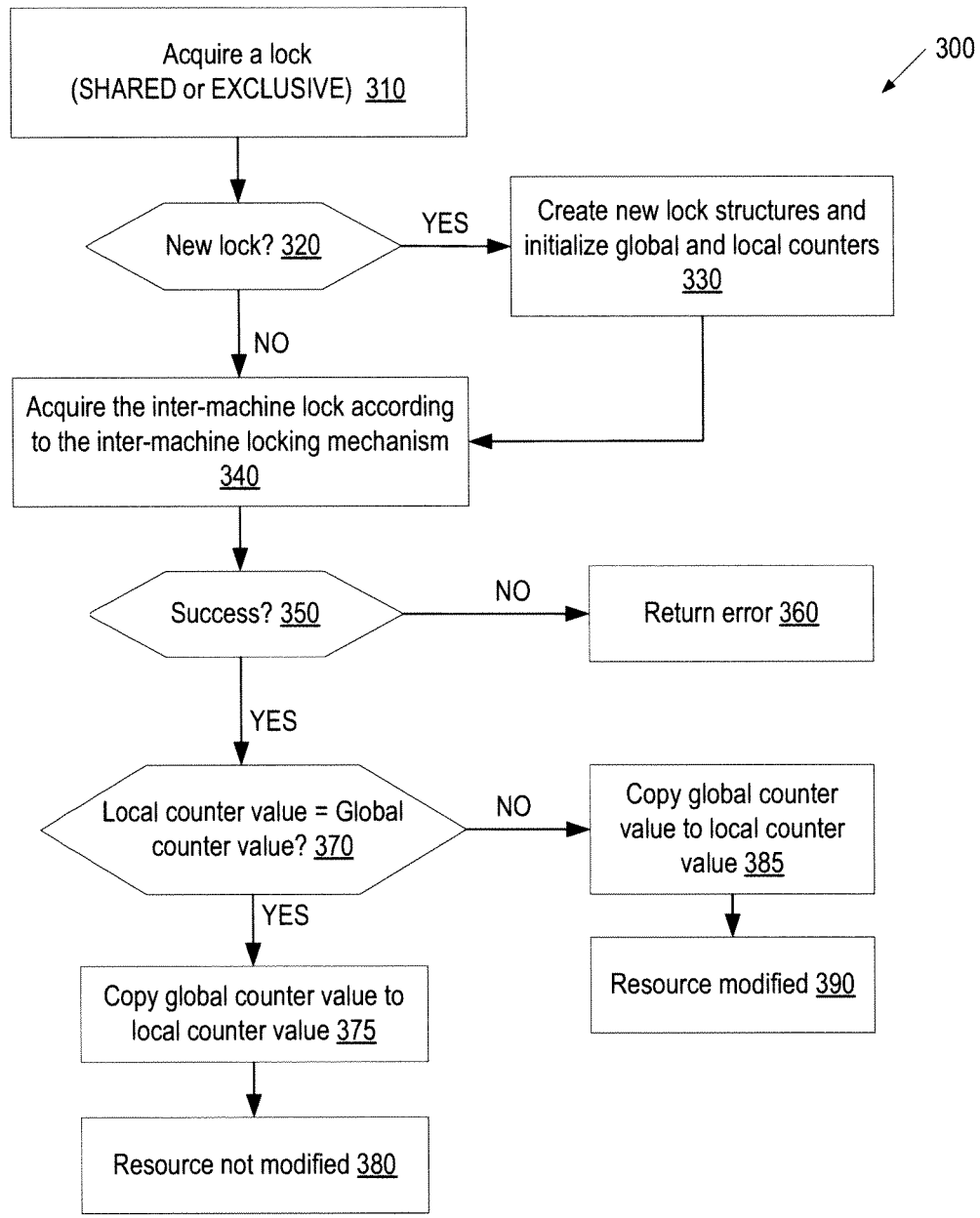
FIG. 3 is a flow diagram illustrating one embodiment of a method for lock acquisition.
Figure 4:
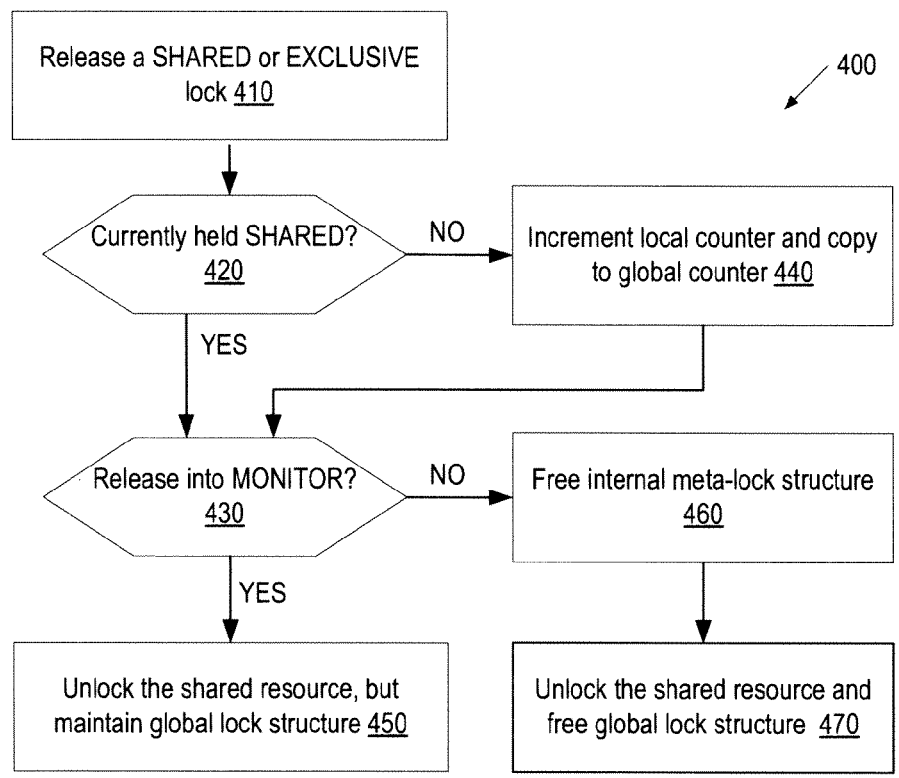
FIG. 4 is a flow diagram illustrating one embodiment of a method for lock release.

FIGS. 3 and 4 illustrate the functions of the augmented API. FIG. 3 is a flow diagram illustrating one embodiment of a method 300 for acquiring a lock. The method 300 may be performed by computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the lock managers 107 of FIG. 1 and FIG. 2.

Referring to FIG. 3, in one embodiment, the method 300 begins when a requesting machine (e.g., one of the processing systems 108) intends to access a shared resource. The lock manager 107 of the requesting machine acquires a SHARED or EXCLUSIVE lock associated with the resource through the augmented API of FIG. 2 (block 310). For the purpose of this example, it is assumed that another machine, referred to as a lock managing machine, is responsible for maintaining the global lock structure 210 for this lock. If the lock does not exist (i.e., a new lock) (block 320), a new global lock structure 210 and a new internal meta-lock structure 220 are created and the corresponding global counter 214 and the local counter 254 are initialized (block 330). The requesting machine then proceeds to acquire an inter-machine lock according to the underlying inter-machine locking mechanism (which can be the DLM or other distributed or centralized locking mechanisms) (block 340). If the lock is not new (block 320), which means the corresponding structures 210 and 220 already exist, the requesting machine proceeds directly to acquire the inter-machine lock according to the underlying inter-machine locking mechanism (block 340).

At block 340, the requesting machine receives an indication of whether the lock is successfully acquired (block 350). If the lock cannot be successfully acquired, an error is returned to the requesting machine (block 360). If the lock is successfully acquired, the requesting machine receives an indication of whether or not the shared resource has been modified. In one embodiment, the indication is a result of comparing the values of the global counter 214 and the local counter 254 (block 370). After the comparison is performed, the value of the global counter 214 is copied to the local counter 254 regardless of the outcome of the comparison (blocks 375 and 385). A global counter value that is equal to the local counter value indicates that the shared resource has not been modified (block 380). Otherwise, the shared resource has been modified (block 390).

FIG. 4 is a flow diagram illustrating one embodiment of a method 400 for releasing a lock. The method 400 may be performed by computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the lock managers 107 of FIG. 1 and FIG. 2. Referring to FIG. 4, in one embodiment, the method 400 begins when a requesting machine requests to release a SHARED or EXCLUSIVE lock (block 410). If the lock is currently held by the requesting machine in the SHARED mode (block 420), the requesting machine proceeds to release the lock. If the lock is currently held by the requesting machine in the EXCLUSIVE mode (block 420), the requesting machine, through the augmented locking mechanism, increments the local counter 254, copies the local counter value into the global counter 214 (block 440), and subsequently releases the lock. The requesting machine may release the lock into the UNLOCK mode (e.g., when it finishes the use of the shared resource) or the MONITOR mode (e.g., when subsequent usage is expected). When the lock is released into the MONITOR mode (block 430), the shared resource is unlocked for use by other machines and the global lock structure 210 for the lock is maintained for access by other machines (block 450). When the lock is not released into the MONITOR mode (i.e., into the UNLOCK mode) (block 430), the requesting machine frees the internal meta-lock structure 220 for the lock (block 460). Additionally, the shared resource is unlocked for use by other machines and the shared memory storing the global lock structure 210 for the lock is freed for other uses (block 470).

In an alternative embodiment, the information about whether a resource has changed can be derived with a callback mechanism implemented by a lock manager. In this alternative embodiment, a lock released into the MONITOR mode by a first machine would have its lock mode 213 recorded as SHARED in the global lock structure 210. When a second machine requests the lock in the EXCLUSIVE mode, the second machine issues a 'callback' to all the other machines to release their locks. Upon receiving the callback, the first machine unlocks the SHARED inter-machine lock, and sets a flag indicating that the resource has been modified (because the second machine is acquiring the lock exclusively). Subsequently, when the first machine wishes to acquire the lock again, it does so with an indication of the flag that the resource has been changed. If, between the time the first machine releases the lock and re-acquires the lock, no other machine had come along requesting an EXCLUSIVE lock, the 'callback' would have never occurred and the resource is known to be unaltered.

Embodiments of the present invention provide a simple-to-use, cluster-wide, locking mechanism that can generally be applicable to a wide range of products. Engineers and programmers can make their products cluster-aware without the amount of effort normally required. The augmented locking mechanism has broad usage and promotes robustness in a tightly-coupled cluster.

A use case for the augmented locking mechanism is provided below. In one scenario, the information about whether a shared resource has been modified can be used to improve the performance of snapshot processing. In this context, a snapshot is a point-in-time copy of a storage device (i.e., the Origin). It functions by storing old portions of data from the Origin in a separate area—the Copy On Write (COW) device—before overwriting them with new data. Subsequent alterations to the same location on the Origin do not require the COW device to be updated, since a copy of the old data from the point-in-time of the snapshot is already recorded on the COW device. Old versions of the data accumulate in the COW device as new locations in the Origin are changed. When multiple processing systems are sharing a snapshotted storage device, they are all responsible for updating the COW device when the Origin changes. Their efforts must be coordinated, or conflicting changes will be made to the COW device—causing corruption of the information.

When a machine wishes to read from a snapshot—the point-in-time copy of a storage device (Origin)—it first checks the COW device to see if the requested data has been altered and must be retrieved from the COW device. If the data has been changed, the old copy is retrieved from the COW device; otherwise, it is simply read from the Origin. It would be an expensive process if the COW needed to be read every time to check whether or not a particular area of the Origin had changed, so this information is cached for quick look-ups. A single machine operating a snapshot can be confident that its cache is always correct, but in a cluster where the storage is shared, another machine may add new entries to the COW device and invalidate the cache. If this situation is not handled, a machine requesting snapshot data may incorrectly retrieve the data from the Origin—believing the data to be unaltered—even though another machine has altered the data and made the appropriate adjustments to the COW device. The situation is handled by acquiring a SHARED lock on the COW device—preventing changes to the COW device while reading it—and re-reading the COW device for any changes that may have occurred. Again, the re-reading of the COW device is an expensive operation. Embodiments of the invention provide a way of avoiding this expensive operation.

When acquiring a lock through the augmented API, the machine will know whether or not the lock protecting the resource was acquired exclusively (i.e., in the EXCLUSIVE mode). If it has been acquired exclusively, the expensive operation of re-reading the COW is necessary, but if it has not, the operation can be avoided and the cache is known to be valid. This benefit becomes more pronounced as the COW device ages (fills with old copies of data from the Origin), since fewer and fewer alterations will be required and therefore a reduced frequency of machines requiring an EXCLUSIVE lock.

Figure 5:
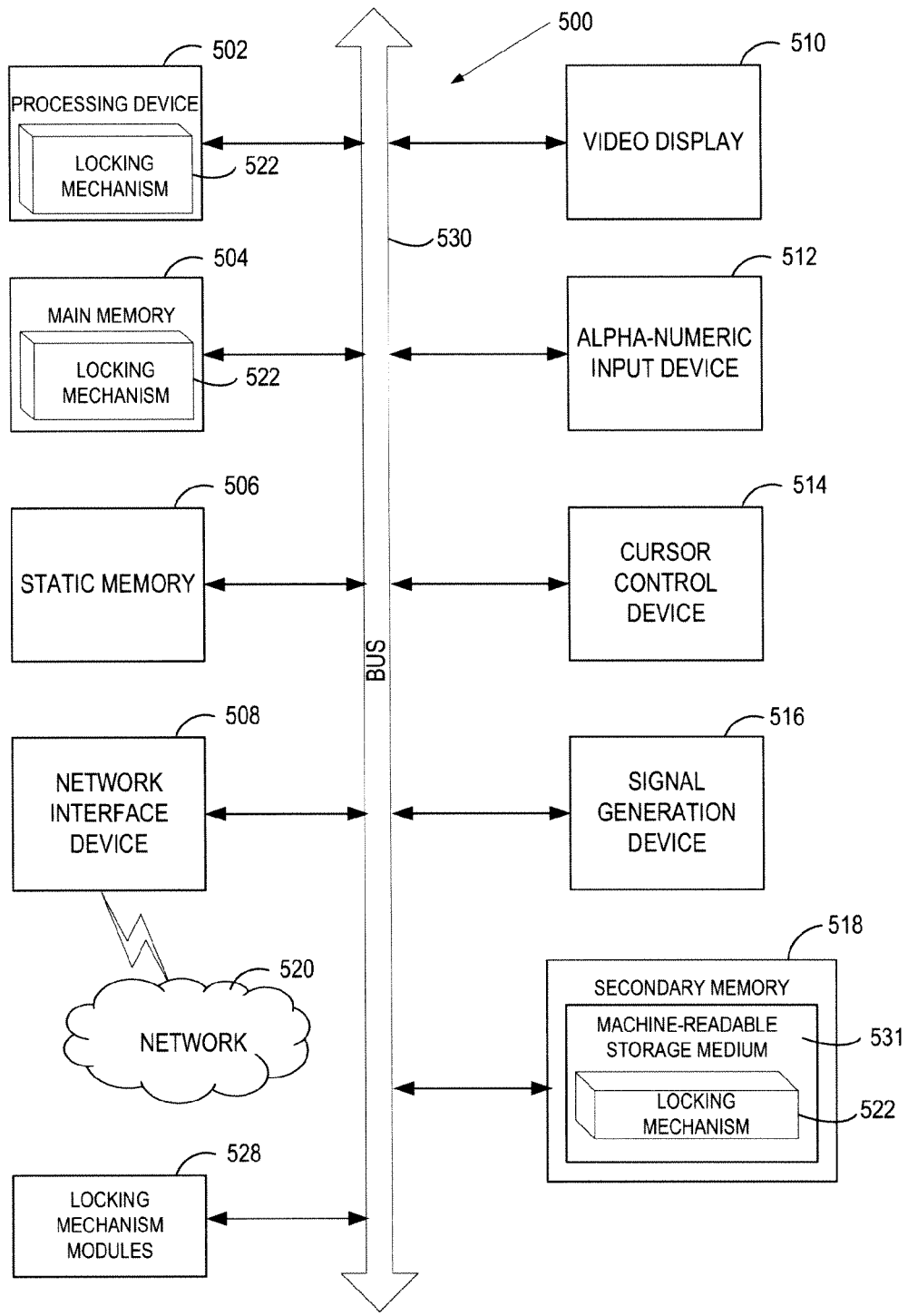
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the locking mechanism 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or, more specifically, a computer-readable storage medium) 531 on which is stored one or more sets of instructions (e.g., a locking mechanism 522) embodying any one or more of the methodologies or functions described herein (e.g., the lock managers 107 of FIGS. 1 and 2). The locking mechanism 522 may also reside, completely or at least partially, within the main memory 504 and/or within the processing device 502 during execution thereof by the computer system 500; the main memory 504 and the processing device 502 also constituting machine-readable storage media. The locking mechanism 522 may further be transmitted or received over a network 520 via the network interface device 508.

The machine-readable storage medium 531 may also be used to store the locking mechanism 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 500 may additionally include locking mechanism modules 528 for implementing the functionalities of the lock managers 107 of FIGS. 1 and 2. The modules 528, components and other features described herein (for example in relation to FIG. 1) can be implemented as discrete hardware components or integrated in the functionality of hardware components such as ASICS, FPGAs, DSPs or similar devices. In addition, the modules 528 can be implemented as firmware or functional circuitry within hardware devices. Further, the modules 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "acquiring", "incrementing", "comparing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying a lock location of a resource shared by a cluster of processing devices;
   requesting, by a processing device, a lock from a lock manager of the lock location associated with the resource shared by a cluster of processing devices;
   comparing a value of a global counter received from the lock manager with a value of a local counter;
   determining whether the resource has been modified since a last time the lock was held by the requesting processing device based on whether there is a difference between the value of the global counter and the value of the local counter;
   in response to a determination that the resource has not been modified, using a locally cached version of the resource; and
   in response to a determination that the lock is released into a monitor mode, unlocking access to the resource and maintaining the value of the global counter and the value of the local counter.

2. The method of claim 1, wherein the lock has a lock mode selected from exclusive, shared, monitor, or unlock.

3. The method of claim 1, further comprising incrementing the global counter each time when the lock is acquired by one of the processing devices in an exclusive mode.

4. The method of claim 1, further comprising maintaining a meta-lock structure locally at the requesting processing device to store the local counter.

5. The method of claim 1, further comprising maintaining a global lock structure to store the global counter used by all of the processing devices.

6. The method of claim 1, further comprising copying a value of the local counter to a value of the global counter when the requesting processing device releases the lock.

7. The method of claim 1, further comprising determining that the resource has not been modified when the value of the global counter and the value of the local counter are the same.

8. A system comprising:
   a plurality of processing devices, each processing device of the plurality of processing devices comprising a lock manager that maintains a local counter;
   a resource shared by the plurality of processing devices and associated with a lock;
   shared memory to store a global counter associated with the lock, the global counter accessible by each processing device of the plurality of the processing devices;
   wherein the lock manager of one of the plurality of processing devices is to:
      identify a lock location of the resource shared by the plurality of processing devices;
      request the lock from a lock manager of the lock location associated with the resource;
      increment a value of the global counter upon exclusively acquiring the lock;
      compare, with the local counter, the value of the global counter received from the lock manager with a value of the local counter to determine whether the resource has been modified since a last time a requesting processing device held the lock;
      in response to a determination that the resource has not been modified, use a locally cached version of the resource; and
      in response to a determination that the lock is released into a monitor mode, unlock access to the resource and maintain the value of the global counter and the value of the local counter.

9. The system of claim 8, wherein the lock has a lock mode selected from exclusive, shared, monitor, or unlock.

10. The system of claim 8, wherein the lock manager of a requesting processing device of the plurality of processing devices copies the value of the local counter to the value of the global counter when the requesting processing device releases the lock.

11. The system of claim 8, wherein the lock manager of a requesting processing device of the plurality of processing devices uses a locally cached version of the resource in response to a determination that values of the global counter and the local counter are the same.

12. A non-transitory computer readable storage medium including instructions that, when executed by a processing device, cause the processing device to perform operations comprising:
   identifying a lock location of a resource shared by a plurality of processing devices;
   releasing, by a requesting processing device, a lock into a monitor mode, the lock associated with the resource shared by the plurality of processing devices, the monitor mode indicating access to the resource is finished and subsequent access to the resource is expected;
   acquiring the lock in either an exclusive mode or a shared mode by the requesting processing device after releasing the lock, the exclusive mode and the shared mode indicating an intent of the requesting processing device to modify and read the resource, respectively;

receiving, when the lock is acquired, an indication regarding whether the resource has been modified since a last time the lock was released into the monitor mode;

comparing, by the requesting processing device, a value of a global counter with a value of a local counter;

determining, by the requesting processing device, whether the resource has been modified since the last time the lock was held by the requesting processing device based on whether there is a difference between the value of the global counter and the value of the local counter;

unlocking access to the resource; and in response to a determination that the lock is released into the monitor mode, unlocking access to the resource and maintaining the value of the global counter and the value of the local counter.

13. The computer readable storage medium of claim 12, where the operations further comprise:

maintaining the lock in the shared mode in a global lock structure; and receiving a callback from another processing device when the other processing device requests the lock in the exclusive mode.

14. The computer readable storage medium of claim 13, where the operations further comprise updating a flag locally at the requesting processing device machine when receiving the callback.

15. The computer readable storage medium of claim 12, further comprising incrementing the global counter each time the lock is acquired by one of the plurality of processing devices in an exclusive mode.

16. The computer readable storage medium of claim 12, further comprising:

maintaining a meta-lock structure locally at the requesting processing device to store the local counter; and maintaining a global lock structure to store the global counter used by the plurality of processing devices.

* * * * *